United States Patent [19]
Dykes et al.

[11] Patent Number: 5,668,688
[45] Date of Patent: Sep. 16, 1997

[54] CURRENT PERPENDICULAR-TO-THE-PLANE SPIN VALVE TYPE MAGNETORESISTIVE TRANSDUCER

[75] Inventors: John West Dykes; Young Keun Kim, both of Boulder, Colo.

[73] Assignee: Quantum Peripherals Colorado, Inc., Louisville, Colo.

[21] Appl. No.: 653,322

[22] Filed: May 24, 1996

[51] Int. Cl.$^6$ ........................................... G11B 5/39
[52] U.S. Cl. ................................................. 360/113
[58] Field of Search ................................. 360/113

[56] References Cited

U.S. PATENT DOCUMENTS

| | | | |
|---|---|---|---|
| 5,159,513 | 10/1992 | Dieny et al. | 360/113 |
| 5,206,590 | 4/1993 | Dieny et al. | 324/252 |
| 5,287,238 | 2/1994 | Baumgart et al. | 360/113 |
| 5,301,079 | 4/1994 | Cain et al. | 360/113 |
| 5,390,061 | 2/1995 | Nakatani | 360/113 |
| 5,576,915 | 11/1996 | Akiyama et al. | 360/113 |

OTHER PUBLICATIONS

Baibich, M.N., Broto, J.M., Fert, A., Nguyen Van Dau, F., Petroff, F., Eitenne, P., Creuzet, G., Friederich, A. and Chazelas, J., "Giant Magnetoresistance of (001)Fe/(001)Cr Magnetic Superlattices," Physical Review Letters vol. 61, No. 21, pp. 2472-2475, (1988).

Covault, Mike, Janstrom, Tom, Davidson, Robert and Simmons, Ralph, Hewlett Packard, "DSMR Heads: The Plug and Play MR Head technology," DAT Tape Storage, Computer technology Review, pp. 62-66.

Dieny, B., Speriosu, V.S., Parkin, S.S.P., Gurney, B.A., Wilhoit, D.R. and Mauri D., "Giant Magnetoresistance in Soft Ferromagnetic Multilayers," Physical Review B, Physical Review B, vol. 43, No. 1, pp. 1297-1300 (1991).

O'Handley, R.C., "Giant Magnetoresistance and Spin Valves," May 4, 1994, Ch. 11, pp. 55-80.

Rottmayer, Robert, Zhu, Jian-Gang, "A new Design For An Ultra-High Density Magnetic Recording Head Using a GMR Sensor In The CCP Mode", IEEE Transactions on Magnetics, vol. 31, No. 6, Nov. 1995.

*Primary Examiner*—A. J. Heinz
*Attorney, Agent, or Firm*—William J. Kubida; Holland & Hart LLP

[57] ABSTRACT

A transducer includes a spin valve ("SV") structure comprising a pinned ferromagnetic layer adjoining a first end portion thereof and a freely rotating ferromagnetic layer adjoining an oppositely disposed second end portion thereof. First and second current conductors adjoin the first and second end portions of the spin valve structure respectively in a current perpendicular-to-the-plane configuration ("CPP"). In a particular embodiment disclosed herein, a differential CPP transducer includes a pair of SV structures having first and second current conductors with a common current conductor intermediate the SV structures.

55 Claims, 6 Drawing Sheets

CURRENT PERPENDICULAR-TO-THE-PLANE SPIN VALVE TYPE MAGNETORESISTIVE TRANSDUCER

CROSS REFERENCE TO RELATED APPLICATIONS

The present invention is related to the subject matter of U.S. Pat. No. 5,485,334 for "Magnetoresistive Device and Method Having Improved Barkhausen Noise Suppression" issued Jan. 16, 1996 to J. Lamar Nix et al. and to U.S. patent application Ser. No. 08/401,553 for "Shaped Spin Valve Type Magnetoresistive Transducer and Method for Fabricating the Same Incorporating Domain Stabilization Technique" filed Mar. 9, 1995 by Young Keun Kim. The foregoing United States Patent and Patent Application are assigned to Quantum Peripherals Colorado, Inc., assignee of the present invention and the disclosures thereof are specifically incorporated herein by this reference.

BACKGROUND OF THE INVENTION

The present invention relates, in general, to the field of magnetoresistive ("MR") spin valve ("SV") devices. More particularly, the present invention relates to a current perpendicular-to-the-plane ("CPP") spin valve device design, as well as an alternative differential sensing embodiment thereof, for use, for example, as a magnetic transducer or "head" for reading data signals encoded on a magnetic mass storage medium.

Magnetoresistive devices or heads exhibiting what is referred to as giant magnetoresistance ("GMR") are of current technological interest in an attempt to achieve higher areal density recording in magnetic computer mass storage disk drives and tapes. The GMR effect was first described by M. N. Baibich, J. M. Broto, A. Fert, F. Nguyen Van Dau, F. Petroff, P. Etienne, G. Creuzet, A. Friederich and J. Chazelas in Phys. Rev. Lett. 61, 2472 (1988). Typically, the magnitude of the magnetoresistive ratio ("$\Delta R/R$") for GMR materials exceeds that of anisotropic magnetoresistive ("AMR") materials, which are those generally in current use as magnetic read-transducers.

The spin valve effect is one known way to utilize GMR as described by B. Dieny, V. S. Speriosu, S. S. P. Parkin, B. A. Gurney, D. R. Wilhoit and D. Mauri, Phys. Rev. B 43, 1297 (1991). A typical spin valve MR device comprises two thin ferromagnetic layers (on the order of less than 100 Å) separated by a nonmagnetic metal spacer (also on the order of less than 100 Å). The magnetization of one ferromagnetic layer is allowed to move freely, whereas the other one is pinned by an adjacent antiferromagnetic or permanent magnetic layer. Essential to the operation of any type of GMR structure is the fact that the MR response is a function of the angle between two magnetization vectors corresponding to the sensing field.

A number of patents have previously described various device implementations utilizing the spin valve effect. See for example United States Patents No.: U.S. Pat. No. 5,159,513 to Dieny et al. for "Magnetoresistive Sensor Based on the Spin Valve Effect" issued Oct. 27, 1992; 5,206,590 to Dieny et al. for "Magnetoresistive Sensor Based on the Spin Valve Effect" issued Apr. 27, 1993; U.S. Pat. No. 5,287,238 to Baumgart et al. for "Dual Spin Valve Magnetoresistive Sensor" issued Feb. 15, 1994; and U.S. Pat. No. 5,301,079 to Cain et al. for "Current Biased Magnetoresistive Spin Valve Sensor" issued Apr. 5, 1994, all assigned to International Business Machines Corporation.

The stacked, orthogonal structures of the various device implementations described in these patents locate a lower ferromagnetic layer (on which the freely rotating magnetization vector resides) above the substrate but below the upper ferromagnetic layer which has its magnetization vector pinned by an adjacent antiferromagnetic pinning layer. Moreover, in all cases the sense current is shown to flow in the plane of the layers which comprise the spin valve structure, thereby limiting the MR response. Since the current density lies within the film plane of the magnetoresistive structure, this is known as a current-in-plane ("CIP") geometry.

In "A New Design for an Ultra-High Density Magnetic Recording Head Using a GMR Sensor In the CPP Mode"; Rottmayer, R. and Zhu, J.; IEEE Transactions on Magnetics, Vol. 31, No. 6, November 1995 there has been proposed a GMR multilayer read element within a write head gap that operates in the current perpendicular-to-the-plane mode and is biased by an exchange coupled soft film acting like a permanent magnet while distinguishing conventional MR and SV head designs. A multilayer read element consists of a repeated layer structure which is quite different from a spin valve type GMR transducer which comprises both pinned and freely rotating ferromagnetic layers as previously described. Moreover, the Rottmayer et al. paper contemplates the placement of the multilayer sensor in the write gap of a read/write head with a soft biasing magnet exchange coupled to an antiferromagnet to bias the sensor into a linear operating range. The placement of the read sensor within the write gap is a relatively unproven configuration due to the fact that the read sensor could suffer serious degradation through repeated exposure to fields generated during write current bursts.

SUMMARY OF THE INVENTION

In contrast, the present invention is of especial utility in advantageously providing a spin valve type transducer, and not a multilayer GMR sensor as previously proposed, operating in a current perpendicular-to-the-plane configuration. A spin valve type GMR transducer, since it is inherently self-biased, does not require the soft biasing magnet exchange coupled to an antiferromagnet as proposed by Rottmayer et al. Moreover, the SV transducer herein disclosed is of especial utility in conjunction with the standard configuration for read/write heads wherein the write element may be placed on top of the read element without exposure to the fields generated during write current bursts.

Specifically disclosed herein is a transducer including a spin valve structure comprising a pinned ferromagnetic layer adjoining a first end portion thereof and a freely rotating ferromagnetic layer adjoining an oppositely disposed second end portion thereof. First and second current conductors adjoin the first and second end portions of the spin valve structure respectively in a current perpendicular-to-the-plane configuration.

In a specific embodiment disclosed herein, a differential data transducer includes first and second spin valve structures each comprising a pinned ferromagnetic layer adjoining respective first end portions thereof and a freely rotating ferromagnetic layer adjoining respective oppositely disposed second end portions thereof. First and second current conductors adjoin the first and second end portions of the first and second spin valve structures respectively and a common current conductor adjoins the second and first end portions of the first and second spin valve structures respectively.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
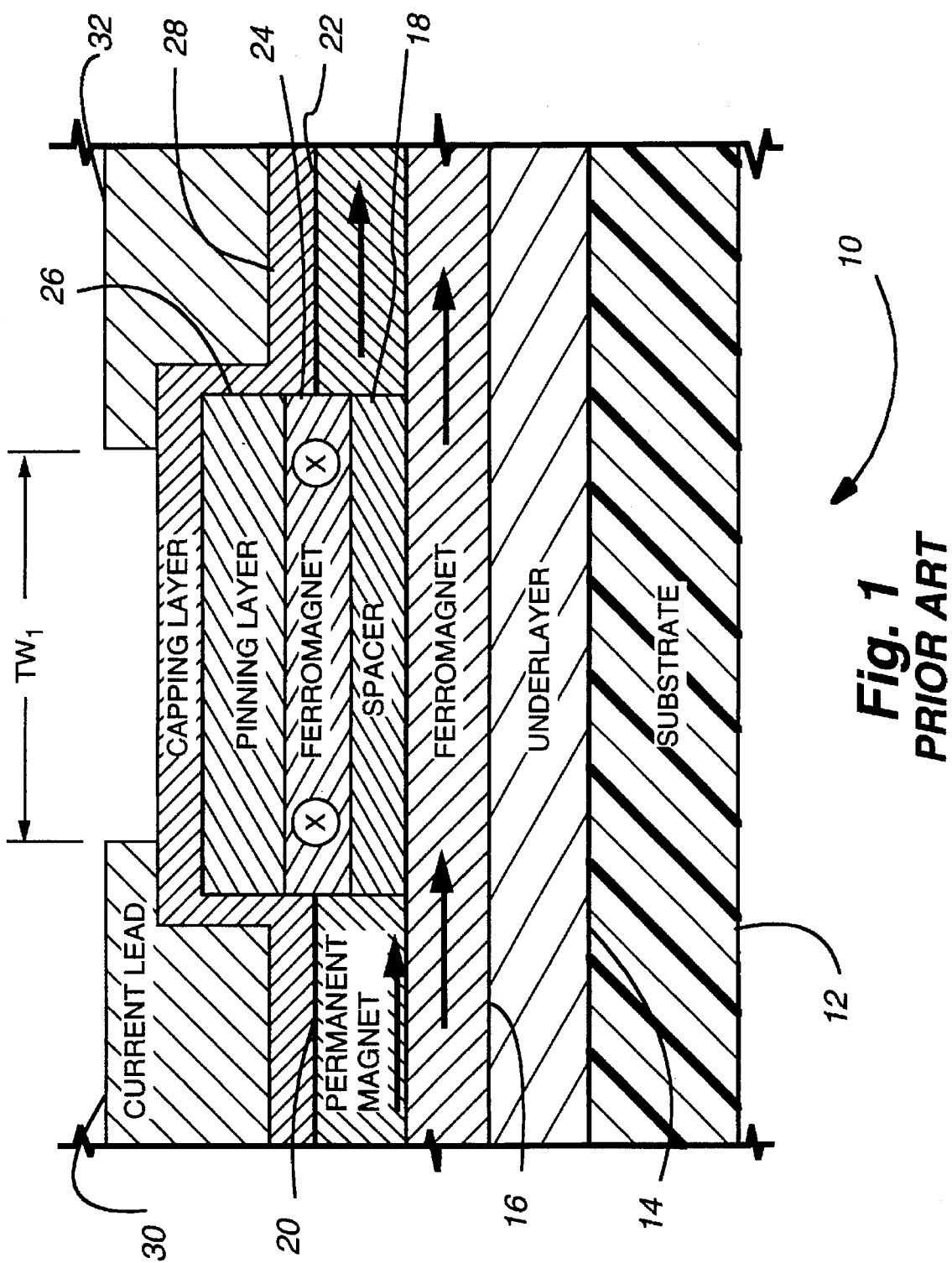
FIG. 1 is a schematic cross-sectional, air bearing surface ("ABS") view of a prior art spin valve device wherein the read track width "$TW_1$" is defined by the metallization of the current-in-plane geometry leads overlying the pinned, upper ferromagnetic layer.

With reference now to FIG. 1, a prior art spin valve sensor 10 structure is depicted illustrating a typical current-in-plane device configuration. The prior art spin valve sensor 10 comprises, in pertinent part, a substrate 12 having an overlying underlayer 14. The active spin valve structure itself comprises two ferromagnetic layers (formed of transition metals or alloys such as permalloy) illustrated as a lower ferromagnetic layer 16 and upper ferromagnetic layer 24 separated by a nonmagnetic spacer layer 18 (formed of a noble metal such as Cu, Ag, or Au). A pinning layer 26, which may comprise an antiferromagnet such as FeMn, NiMn or Ni—Co oxides, is deposited on top of the upper ferromagnetic layer 24 to offer an anisotropic exchange coupling of on the order of several hundred Oersteds ("Oe"). Therefore, the direction of the magnetization of the upper ferromagnetic layer 24 is pinned with its easy axis perpendicular to the air bearing surface (ABS).

The underlayer 14 (such as Ta) and a capping layer 28 (which may also comprise Ta) are provided to protect the active structure. Permanent magnet layers 20, 22 are formed at the sides of the substantially orthogonal, stacked structure to offer domain control on the lower ferromagnetic layer 16.

The prior art spin valve sensor 10 may also be provided in a dual configuration having two pinned ferromagnetic layers sandwiching a free ferromagnetic layer. Such a structure leads to approximately a 50% higher response than the structure shown in FIG. 1.

Nevertheless, the prior art spin valve sensor 10 and dual design both suffer from an inherent degradation of MR response. The MR response in a spin valve or any GMR material is due primarily to spin-dependent scattering of the conduction electrons. Utilizing a CIP geometry, some of the conduction electrons are prevented from experiencing spin-dependent scattering by shunting along layers devoid of any spin-dependent scattering centers such as the spacing layer 18. Moreover, the design of FIG. 1 presents potential disadvantages in terms of manufacturing reproducible magnetic read head products inasmuch as a considerable amount of current density is required to deliver current to the spin valve structure through the nonmagnetic pinning and capping layers 26, 28, all of which have inherently high resistivities. Further, the read track width ("$TW_1$") may not be precisely determined because the conductor (or current lead 30, 32) layers are relatively thick compared to the active magnetic sensor structures and both the current leads 30, 32 and the permanent magnet layers 20, 22 could define the track width. This is undesirable in terms of stable read head operation. Moreover, precise control of the thickness of the pair of permanent magnet layers 20, 22 for Barkhausen noise suppression purposes is very difficult due to their limited thickness scale which is only on the order of several tens of Angstroms ("Å"). For example, when a thicker permanent magnet layer 20, 22 is needed to adjust the total magnetic moment (the remnant magnetization times film thickness, $M_r \cdot t$) which, in turn, determines the strength of the stabilization, the permanent magnet layer 20, 22 thickness may become greater than the combined thickness of the spacer and upper ferromagnetic layers 18, 24. This is inherently unsatisfactory because the magnetization of the otherwise firmly pinned upper ferromagnetic layer 24 could be altered.

Figure 2:
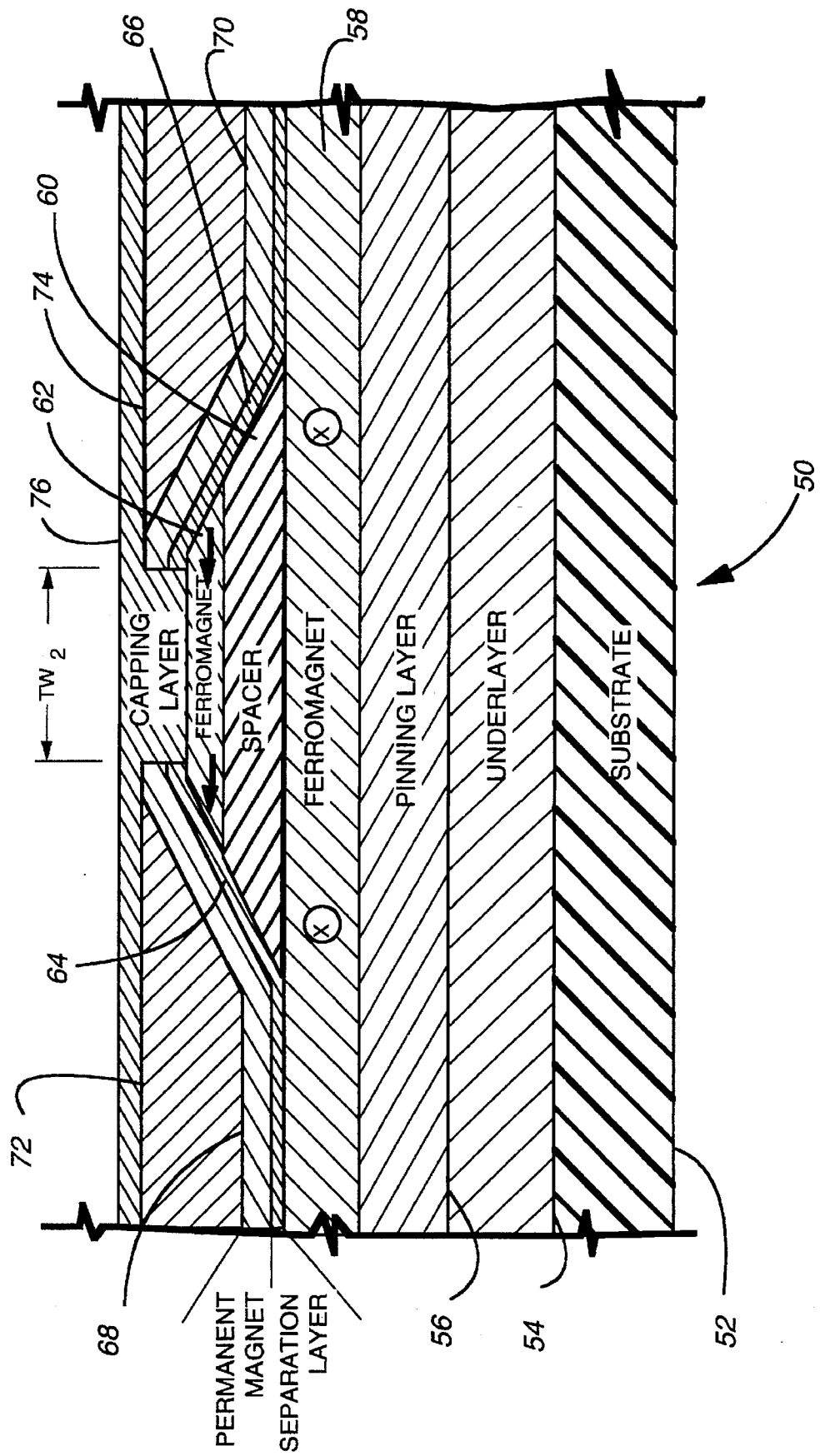
FIG. 2 is a schematic cross-sectional ABS view of a particularly advantageous spin valve device design in accordance with United States patent application Ser. No. 08/401, 553 illustrating a current-in-plane configuration wherein the read track width "$TW_2$" is defined by the permanent magnet layer portions overlying the top ferromagnetic layer and which underlying device structure may be utilized in conjunction with the current perpendicular-to-the-plane design hereinafter disclosed.

With reference to FIG. 2 a shaped spin valve sensor 50 in accordance with the disclosure of U.S. patent application Ser. No. 08/401,553 is shown. In the design of the shaped spin valve sensor 50, a substrate 52 has an overlying underlayer 54 formed thereon and a high resistivity pinning layer 56 is deposited prior to any of the ferromagnetic layers. Deposition of the pinning layer 56 is followed by the deposition of a thin, bottom ferromagnetic layer 58. A spacer layer 60 and a second, top ferromagnetic layer 62 are deposited next and patterned into a mesa-like structure with tapered sides. A shallow taper angle (on the order of substantially 45° or less) has been found to be advantageous in order to achieve overall smoother device topography in fabrication. Thin non-magnetic separation layers 64, 66 (such as Cr) are deposited prior to the permanent magnet layers 68, 70 on the bottom ferromagnetic layer 58 and the sides of the mesa (as well as a portion of the upper surface of the mesa adjoining the tapered sides) to prevent exchange coupling which could result in rotating the pinned magnetization direction of the bottom ferromagnetic layer 58. The formation of current leads 72, 74 in a current-in-plane configuration follow to make contact directly with the permanent magnet layers 68, 70. A capping layer 76 overlies the current leads 72, 74, a portion of the permanent magnet layers 68, 70 and the uncovered portion of the top ferromagnetic layer 62 forming the top of the mesa structure.

In the shaped spin valve sensor 50 shown, it is the permanent magnet layers 68, 70 that define the read track width ("TW$_2$") and not the current leads 72, 74. In this manner, reproducible track width control is made possible because the permanent magnet layers 68, 70 are typically thinner than the conductor layer forming the current leads 72, 74 thereby obviating the latters' more difficult photo-lithographical challenges. Moreover, because current can then be delivered directly to the active, top ferromagnetic layer 62 through the permanent magnet layers 68, 70 and thin separation layers 64, 66, higher current density can be achieved than in the prior art CIP designs.

Figure 3A:
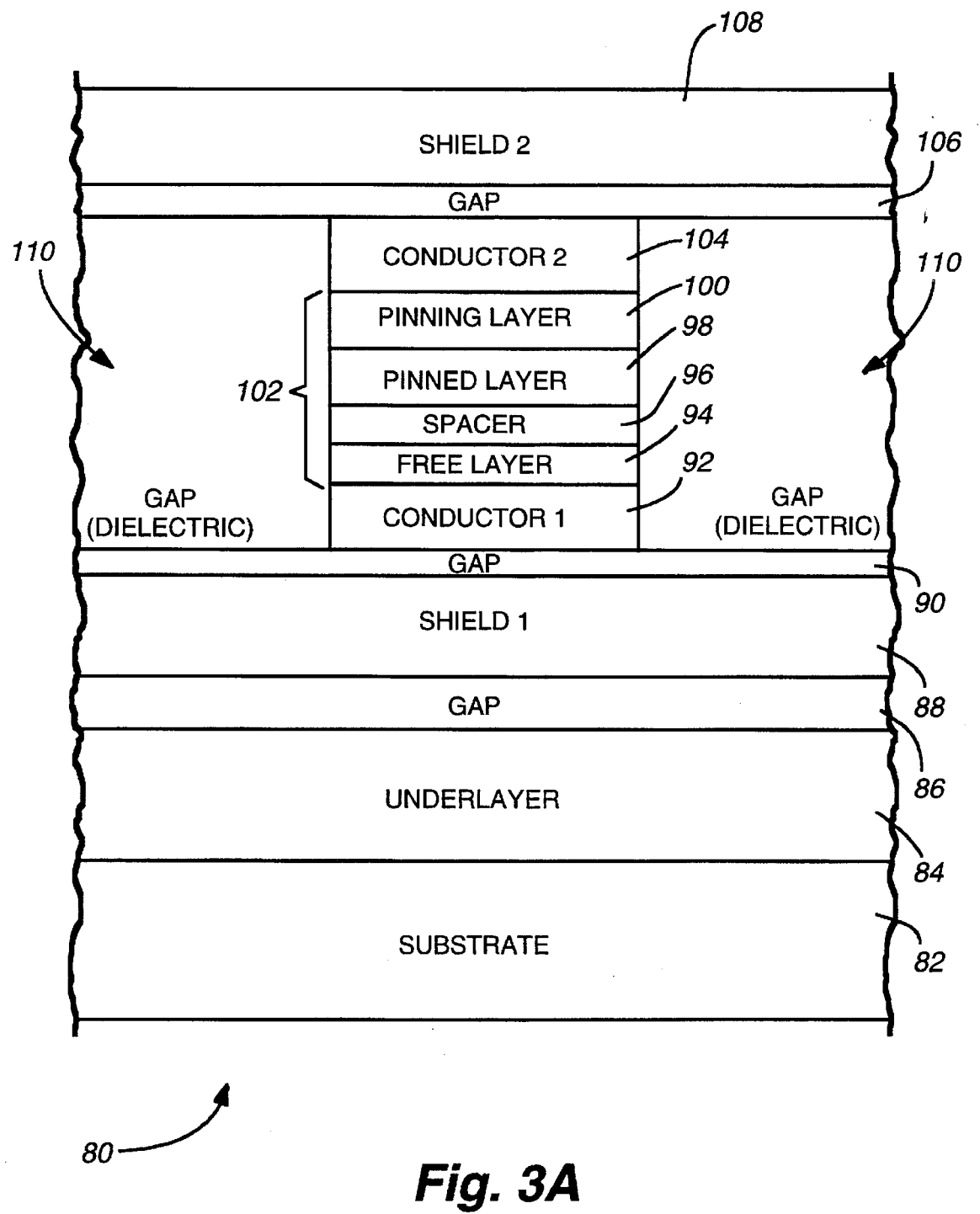
FIG. 3A is a partial ABS view of a current perpendicular-to-the-plane spin valve type magnetoresistive transducer in accordance with a particular embodiment of the present invention illustrating a single spin valve structure comprising a pinning layer overlying a pinned layer, with the combination of layers, in turn, overlying a freely rotating ferromagnetic layer and the spin valve structure itself being sandwiched between a pair of current conductors and adjoining shields.
Figure 3B:
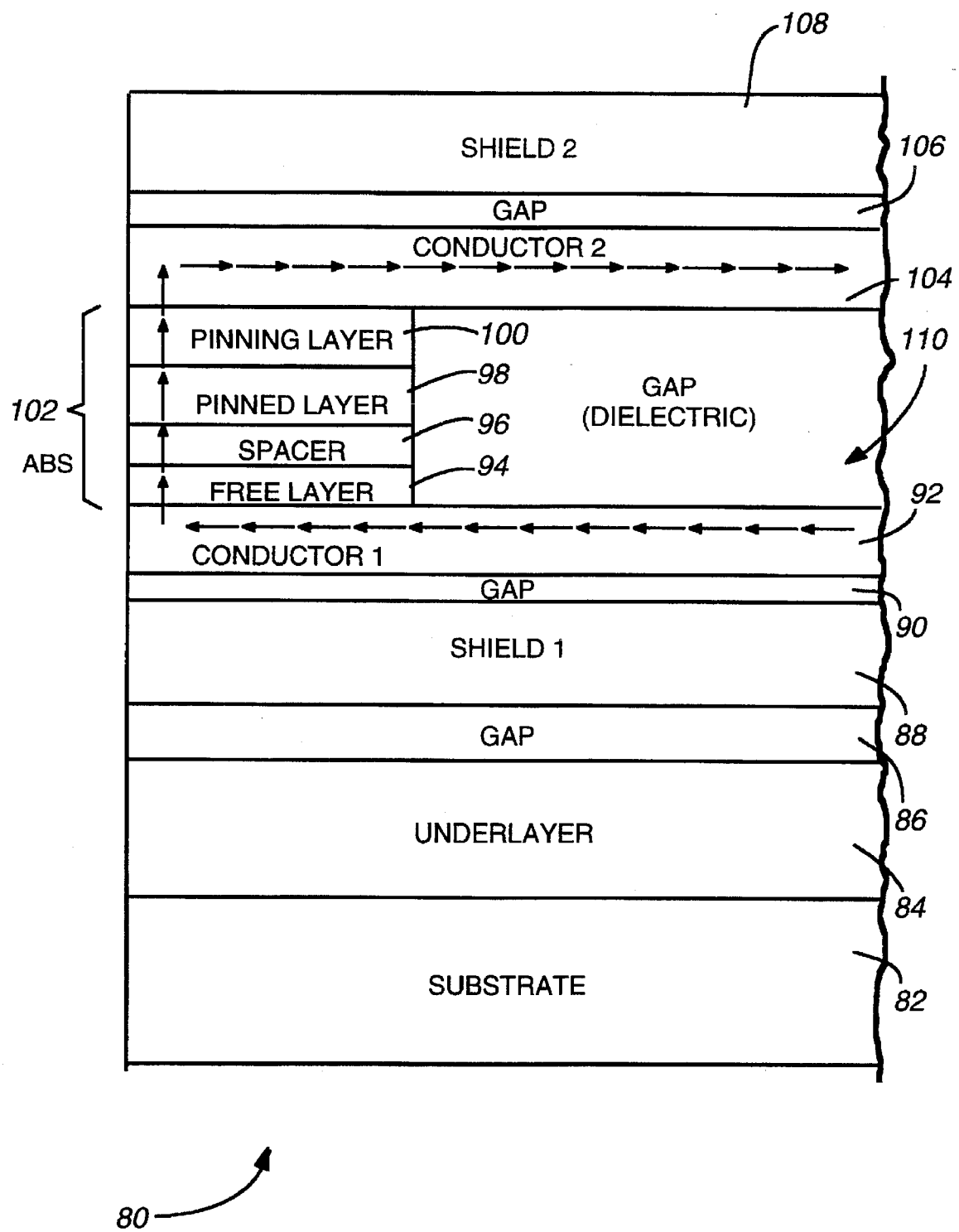
FIG. 3B is a partial side plan view of the spin valve type magnetoresistive transducer of FIG. 3A illustrating the current path through the single spin valve structure and the partially surrounding gap dielectric layer.

With reference additionally now to FIGS. 3A and 3B, a partial ABS view of a current perpendicular-to-the-plane spin valve type magnetoresistive transducer 80 in accordance with a particular embodiment of the present invention is shown. It should be noted that the spin valve structure of FIG. 2, wherein the pinning layer 56 and pinned ferromagnetic layer 58 underlie the active ferromagnetic layer 62, may be utilized instead of the more conventional arrangement of active and pinned layers shown.

The transducer 80 comprises, in pertinent part, a substrate 82 having an overlying underlayer 84 thereupon. In turn, an insulating gap layer 86 overlies the underlayer 84. A first magnetic shield 88 overlies the gap layer 86 as shown. An optional gap layer 90, which may comprise aluminum oxide ($Al_2O_3$) or silicon dioxide($SiO_2$) may be formed upon the first magnetic shield 88. The shield layers may comprise nickel iron (NiFe), cobalt zirconium tantalum (CoZrTa), iron nitride (FEN) or other soft magnetic materials or their alloys. The shield layers may be on the order of 2 microns or less in thickness while the gap layer 90 may be between 100 and 1000 angstroms.

A first current conductor 92 is formed on top of the gap layer 90. The first current conductor 92 may comprise between 100 and 1000 angstroms of rhodium (Rh), aluminum (Al), gold (Au), tantalum (Ta) or silver (Ag) or their alloys. A freely rotating ("Free" or "Active") layer 94 overlies the first current conductor 92. A non-magnetic spacer layer 96 overlies the free layer 94 and a pinned layer 98 is formed on top of the spacer layer 96. A pinning layer 100 overlies the pinned layer 98 and a second current conductor 104, of material similar to that utilized to produce first current conductor 92, is formed thereon. The first and second current conductors 92, 104 in conjunction with the free layer 94, spacer layer 96, pinned layer 98 and pinning layer 100 comprise a spin valve structure 102 as shown.

In similar manner, an optional gap layer 106 overlies the second current conductor 104 followed by a second magnetic shield 108. A dielectric gap material 110 surrounds the spin valve structure 102 and portions of the first and second current conductors 92, 104 as shown.

The transducer 80, as an example only, is shown as a single spin valve structure 102 comprising a pinning layer 100 overlying a pinned layer 98, with the combination of layers, in turn, overlying a freely rotating ("free" or "active") ferromagnetic layer 94 and the spin valve structure 102 itself being sandwiched between a pair of first and second current conductors 92, 94 and adjoining first and second magnetic shields 88, 108.

With reference specifically to FIG. 3B the current path through the single spin valve structure 102 is shown in addition to the partially surrounding gap dielectric material 110. Utilizing a CPP geometry for the transducer 80 forces the current to traverse each layer of the spin valve structure 102 thereby preventing shunting currents which would otherwise reduce spin-dependent scattering and, hence, the magnetoresistive response. In this manner a CPP geometry transducer 80 will display a higher magnetoresistive response than a comparable CIP device. Although not illustrated, a permanent magnet may be added to the structure of the transducer 80 to provide domain control and, in some applications, the conductors 92, 104 might be eliminated and the shields 88, 108 instead utilized as the transducer 80 conduction paths.

It should also be noted that the spin valve structure 102 may be substantially as illustrated or, in an alternative embodiment, the spin valve structure of FIG. 2 might be substituted therefor. Moreover, the spin valve structure 102 may instead be a dual-spin valve type device comprising two or more spin-valves separated by a relatively thick conductor spacing layer. With proper orientation of the respective pinning layers of a dual-spin valve device, two spin-valves in series could function analogously to a dual-stripe AMR magnetoresistive sensor.

Figure 4:
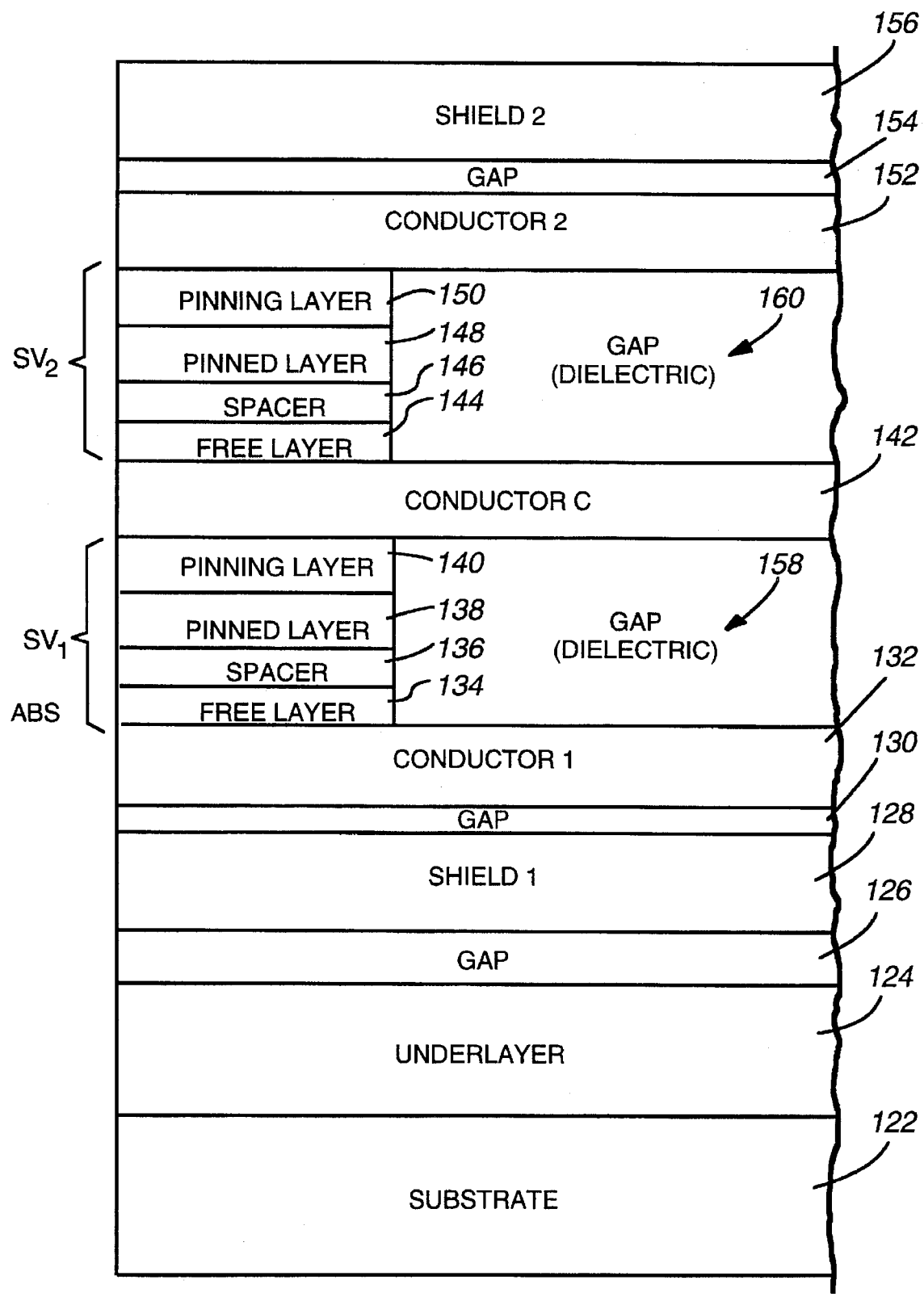
FIG. 4 is an additional partial side plan view of an alternative embodiment of a spin valve type magnetoresistive transducer in accordance with the present invention illustrating a pair of spin valve structures ("$SV_1$" and "$SV_2$") constructed in a current perpendicular-to-the-plane configuration for use as a differential signal sensor.

With reference additionally now to FIG. 4, an alternative embodiment of a spin valve transducer 120 is shown which may be utilized as a differential read head. The transducer 120 includes a substrate 122 and overlying underlayer 124, an overlying gap layer 126 and a first magnetic shield 128. As with the preceding embodiment of FIGS. 3A & 3B, an optional gap layer 130 may be provided on top of the first magnetic shield 128.

Similarly, a first spin valve structure ("SV$_1$") comprises a first current conductor 132, a free layer 134, a spacer layer 136, a pinned layer 138 and a pinning layer 140. A common current conductor ("Conductor C") 142 overlies the pinning layer of the first spin valve structure SV$_1$. The structure of a second spin valve structure ("SV$_2$") comprising a free layer 144, a spacer layer 146, a pinned layer 148 and a pinning layer 150 is formed on the common conductor 142. A second current conductor 152 is formed on top of the pinning layer 150 of the second spin valve structure SV$_2$. In like manner, an optional gap layer 154 may be formed on top of the second current conductor 152 followed by a second magnetic shield 156.

A CPP spin-valve transducer as described and illustrated with respect to the foregoing FIGS. 3A, 3B and 4 is also simpler to manufacture and process than a conventional CIP design since the former is inherently planar thereby easing photolithographic processing operations. Moreover, a CPP spin-valve transducer as hereinbefore disclosed may be manufactured utilizing fewer processing steps.

Figure 5:
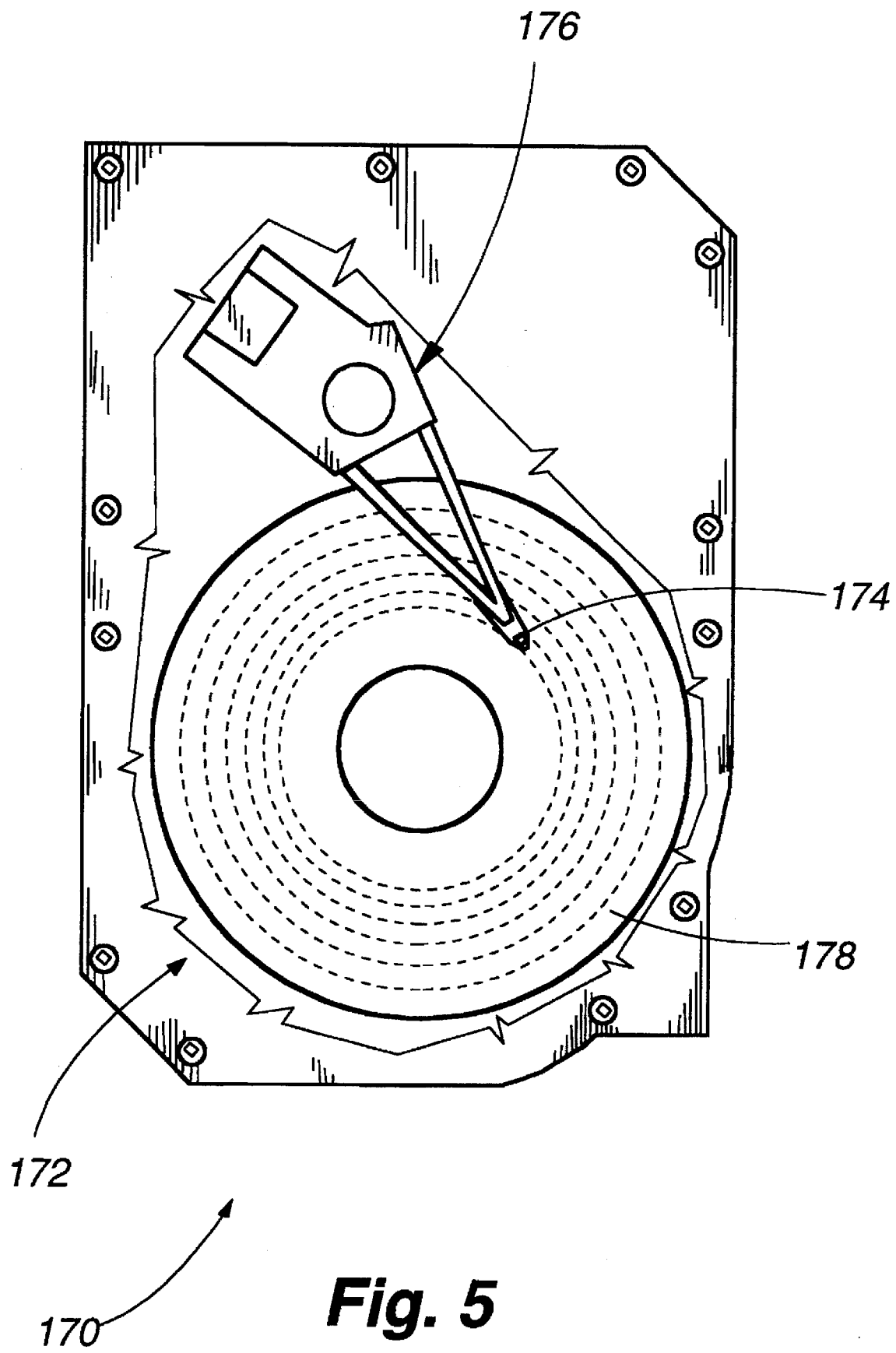
FIG. 5 is a simplified, cut-away, top plan view of a conventional disk drive constituting one application of a current perpendicular-to-the plane transducer of the present invention as a magnetic "read" head.

With reference additionally now to FIG. 5, a simplified, cut-away, top plan view of a disk drive 170 is shown for possible use in conjunction with the current perpendicular-to-the-plane transducer of the present invention. The disk drive 170 comprises, in pertinent part, a number of disks 172 which are rotated about a central axis. A read/write head 174, which may include an a transducer in accordance with the present invention as a "read" element, is positioned by means of a positioner 176 with respect to a number of concentric data tracks on the surfaces 178 of the disks 172 to enable data to be written to, or read from, the magnetically hard surfaces 178 thereof. The transducer hereinbefore disclosed may also be utilized in conjunction with tape drives and other computer mass storage applications as well.

The CPP spin-valve transducer disclosed, therefore, is superior to conventional CIP designs in that it provides an enhanced ΔR/R response (which is on the order of a two-fold increase over conventional CIP geometries), more planar processing and a reduced number of fabrication steps.

While there have been described above the principles of the present invention in conjunction with specific device structure and fabrication techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A spin valve CPP magnetic data transducer having a read-only gap, said transducer comprising:
    a self-biased spin valve stack of parallel and planar elements, said stack having a planar pinned ferromagnetic layer that adjoins a first end of said stack, and said stack having a planar freely rotating ferromagnetic layer that adjoins a second end of said stack;
    each of said ferromagnetic layers having an outer planar surface;
    a first planar electrical current conductor electrically contacting said outer surface of said freely rotating ferromagnetic layer;
    a second planar electrical current conductor electrically contacting said outer surface of said pinned ferromagnetic layer;
    each of said conductors having an outer surface;
    a first soft magnetic shield adjoining said outer surface of said first conductor;
    a second soft magnetic shield adjoining said outer surface of said second conductor;
    a physical spacing of said first and second magnetic shields defining said read-only gap; and
    at least one of said magnetic shields having an outer surface.

2. The transducer of claim 1 further comprising a planar pinning layer intermediate said outer surface of said pinned layer and said second conductor.

3. The transducer of claim 2 wherein said pinning layer comprises an exchange coupled antiferromagnet.

4. The transducer of claim 3 wherein said exchange coupled antiferromagnet is selected from a group comprising FeMN, NiMn, NiO and NiCoO.

5. The transducer of claim 2 wherein said pinning layer comprises a permanent magnet layer.

6. The transducer of claim 5 wherein said permanent magnet layer is selected from a group comprising Cr and its alloys.

7. The transducer of claim 5 wherein said permanent magnet layer is substantially between 50–500 Å thick.

8. The transducer of claim 1 further comprising a planar spacer layer intermediate said pinned and freely rotating layers.

9. The transducer of claim 8 wherein said spacer layer comprises a non-magnetic material.

10. The transducer of claim 9 wherein said non-magnetic material comprises a noble metal.

11. The transducer of claim 8 wherein said spacer layer is substantially between 10–50 Å thick.

12. The transducer of claim 1 further comprising first and second planar gap layers respectively disposed intermediate said first and second conductors and said first and second magnetic shields.

13. The transducer of claim 12 wherein said first and second gap layers are selected from a group comprising $Al_2O_3$ and $SiO_2$.

14. The transducer of claim 13 wherein said first and second gap layers are substantially between 100–1000 Å in thickness.

15. The transducer of claim 1 further comprising a substrate and an overlying underlayer adjoining said outer surface of said at least one of said magnetic shields.

16. The transducer of claim 15 further comprising a gap layer interposed between said underlayer and said outer surface of said at least one of said magnetic shields.

17. The transducer of claim 15 wherein said underlayer is selected from a group comprising Ta and oxides of Al and Si.

18. The transducer of claim 1 wherein said pinned and freely rotating ferromagnetic layers comprise a transition metal.

19. The transducer of claim 18 wherein said transition metal comprises permalloy.

20. The transducer of claim 1 wherein said pinned and freely rotating ferromagnetic layers are substantially between 20–200 Å thick.

21. The transducer of claim 20 wherein said pinned and freely rotating ferromagnetic layers are substantially 100 Å thick.

22. The transducer of claim 1 wherein said first and second current conductors are selected from a group comprising Rh, Al, Au, Ta, Ag and their alloys.

23. The transducer of claim 22 wherein said first and second conductors are substantially between 100–1000 A thick.

24. The transducer of claim 1 further comprising a dielectric substantially surrounding said spin valve stack medially of said first and second conductors.

25. The transducer of claim 1 wherein said first and second magnetic shields comprise a relatively soft magnetic material selected from a group comprising permalloy, NiFe, CoZrTa and their alloys.

26. The transducer of claim 1 wherein said first and second magnetic shields are substantially 2µ or less in thickness.

27. The transducer of claim 1 further comprising:
    a head disk assembly;
    at least one magnetic storage media rotatably contained within said head disk assembly having data encodable thereon; and
    at least one positioner mechanism movably contained within said head disk assembly for positioning said transducer with respect to said storage media to enable reading of selected portions of said data.

28. A differential spin valve CPP magnetic data transducer having a read-only gap, said transducer comprising:
    first and second spin valve stacks having parallel and planar elements;
    each of said stacks having a planar pinned ferromagnetic layer that adjoins a first end of said stack, and a planar freely rotating ferromagnetic layer that adjoins a second end of said stack;

a first planar current conductor adjoining said freely rotating layer of said first spin valve stack;

a second planar current conductor adjoining said pinned layer of said second spin valve stack;

a common planar current conductor adjoining said pinned layer of said first spin valve stack and said freely rotating layer of said second spin valve stack;

a first planar magnetic shield adjoining said first current conductor;

a second planar magnetic shield adjoining said second current conductor; and a physical spacing of said first and second magnetic shields defining said read-only gap.

29. The transducer of claim 28 wherein each of said spin valve stacks further comprises a planar pinning layer overlying said pinned layer:

said pinning layer of said first spin valve stack being located intermediate said common current conductor and said pinned layer of said first spin valve stack; and said pinning layer of said second spin valve stack being located intermediate said second current conductor and said pinned layer of said second spin valve stack.

30. The transducer of claim 29 wherein said pinning layer of said first and second spin valve stacks comprises an exhange coupled antiferromagnet.

31. The transducer of claim 30 wherein said exchange coupled antiferromagnet is selected from a group comprising FeMn, NiMn, NiO and NiCoO.

32. The transducer of claim 29 wherein said pinned layer of said first and second spin valve stacks comprises a permanent magnet layer.

33. The transducer of claim 32 wherein said permanent magnet layer is selected from a group comprising Cr and its alloys.

34. The transducer of claim 33 wherein said permanent magnet layer is substantially between 50–500 Å thick.

35. The transducer of claim 28 wherein each of said spin valve stacks further comprises a spacer layer intermediate said pinned and freely rotating layers.

36. The transducer of claim 35 wherein said spacer layer of each of said first and second spin valve stacks comprises a non-magnetic material.

37. The transducer of claim 36 wherein said non-magnetic material comprises a noble metal.

38. The transducer of claim 35 wherein said spacer layer of each of said first and second spin valve stacks is substantially between 10–50 Å thick.

39. The transducer of claim 28 further comprising first and second gap layers respectively disposed intermediate said first and second current conductors and said first and second magnetic shields.

40. The transducer of claim 39 further comprising a substrate and an overlying underlayer disposed adjacent to a selected one of said first and second magnetic shields.

41. The transducer of claim 40 further comprising an intermediate gap layer interposed between said underlayer and said selected one of said first and second magnetic shields.

42. The transducer of claim 40 wherein said underlayer is selected from a group comprising Ta and oxides of Al and Si.

43. The transducer of claim 39 wherein said first and second gap layers are selected from a group comprising $Al_2O_3$ and $SiO_2$.

44. The transducer of claim 43 wherein said first and second gap layers are substantially between 100–1000 Å in thickness.

45. The transducer of claim 28 wherein said pinned and freely rotating ferromagnetic layers of said first and second spin valve stacks comprise a transition metal.

46. The transducer of claim 45 wherein said transition metal comprises permalloy.

47. The transducer of claim 28 wherein said pinned and freely rotating ferromagnetic layers of said first and second spin valve stacks are substantially between 20–200 A thick.

48. The transducer of claim 47 wherein said pinned and freely rotating ferromagnetic layers are substantially 100 Å thick.

49. The transducer of claim 28 further comprising a first and a second dielectric substantially surrounding said first and second spin valve stacks respectively medially of said first and second current conductors and said common current conductor.

50. The transducer of claim 28 wherein said first, second and common current conductors are selected from a group comprising Rh, Al, Au, Ta, Ag and their alloys.

51. The transducer of claim 50 wherein said first, second and common current conductors are substantially between 100–1000 Å in thickness.

52. The transducer of claim 28 wherein said first and second magnetic shields comprise a relatively soft magnetic material.

53. The transducer of claim 52 wherein said relatively soft magnetic material is selected from a group comprising permalloy, NiFe, CoZrTa and their alloys.

54. The transducer of claim 28 wherein said first and second magnetic shields are substantially 2μ or less in thickness.

55. The transducer of claim 28 further comprising:

a head disk assembly;

at least one magnetic storage media rotatably contained within said head disk assembly having data encodable thereon; and at least one positioner mechanism movably contained within said head disk assembly for positioning said transducer with respect to said storage media to enable reading of selected portions of said data.

* * * * *